(12) United States Patent
Krupka et al.

(10) Patent No.: US 8,873,840 B2
(45) Date of Patent: Oct. 28, 2014

(54) REDUCING FALSE DETECTION RATE USING LOCAL PATTERN BASED POST-FILTER

(75) Inventors: Eyal Krupka, Shimshit (IL); Igor Abramovski, Haifa (IL); Igor Kviatkovsky, Haifa (IL); Jason M. Cahill, Carnation, WA (US); Timothy R. O'Connor, Kirkland, WA (US); Cha Zhang, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 142 days.

(21) Appl. No.: 12/959,383

(22) Filed: Dec. 3, 2010

(65) Prior Publication Data

US 2012/0141017 A1 Jun. 7, 2012

(51) Int. Cl.
*G06K 9/62* (2006.01)
*G06K 9/00* (2006.01)

(52) U.S. Cl.
CPC ........... *G06K 9/6257* (2013.01); *G06K 9/6292* (2013.01); *G06K 9/00228* (2013.01)
USPC ........................................................ 382/159

(58) Field of Classification Search
USPC ................................................ 382/159, 190
See application file for complete search history.

(56) References Cited

U.S. PATENT DOCUMENTS

| | | | |
|---|---|---|---|
| 7,236,626 B2 | 6/2007 | Blake et al. | |
| 7,324,671 B2 * | 1/2008 | Li et al. | 382/118 |
| 7,336,830 B2 | 2/2008 | Porter et al. | |
| 7,430,315 B2 * | 9/2008 | Yang et al. | 382/159 |
| 7,447,338 B2 | 11/2008 | Kim | |
| 7,564,486 B2 * | 7/2009 | Ikeda | 348/222.1 |
| 7,689,033 B2 * | 3/2010 | Xiao et al. | 382/159 |
| 8,050,465 B2 * | 11/2011 | Ianculescu et al. | 382/118 |
| 8,538,172 B2 * | 9/2013 | Bandou et al. | 382/224 |
| 2004/0179719 A1 | 9/2004 | Chen et al. | |
| 2009/0018980 A1 | 1/2009 | Zhang et al. | |
| 2010/0172579 A1 | 7/2010 | Reid et al. | |
| 2011/0106734 A1 * | 5/2011 | Boult et al. | 706/12 |

OTHER PUBLICATIONS (Do, Toan, "Boosted of Haar-Like features and Local Binary Pattern Based face Detection", 2009, IEEE).*
(Abdul Rahim Ahmad, "Machine Learning Using Support vector Machines", Universiti tenaga Nasional, 2002).*

(Continued)

*Primary Examiner* — Stephen R Koziol
*Assistant Examiner* — Totam Le
(74) *Attorney, Agent, or Firm* — Steve Wight; Judy Yee; Micky Minhas (57) ABSTRACT

A training set for a post-filter classifier is created from the output of a face detector. The face detector can be a Viola Jones face detector. Face detectors produce false positives and true positives. The regions in the training set are labeled so that false positives are labeled negative and true positives are labeled positive. The labeled training set is used to train a post-filter classifier. The post-filter classifier can be an SVM (Support Vector Machine). The trained face detection classifier is placed at the end of a face detection pipeline comprising a face detector, one or more feature extractors and the trained post-filter classifier. The post-filter reduces the number of false positives in the face detector output while keeping the number of true positives almost unchanged using features different from the Haar features used by the face detector.

20 Claims, 3 Drawing Sheets

(56) References Cited

OTHER PUBLICATIONS

Zhang, et al., "A Survey of Recent Advances in Face Detection", Retrieved at << http://research.microsoft.com/pubs/132077/facedetsurvey.pdf >>, Jun. 2010, pp. 17.

Viola, et al., "Multiple Instance Boosting for Object Detection", Retrieved at << http://citeseerx.ist.psu.edu/viewdoc/download?doi=10.1.1.70.3725&rep=rep1&type=pdf. >>,Jan. 2007, pp. 8.

Xiao, et al., "Dynamic Cascades for Face Detection", Retrieved at <<http://ieeexplore.ieee.org/stamp/stamp.jsp?tp=&arnumber=4409043 >>, 11th International Conference on Computer Vision, Oct. 14-21, 2007, pp. 8.

Ahonen, et al., "Face recognition with local binary patterns", Retrieved at << http://www.ee.oulu.fi/mvg/files/pdf/pdf_494.pdf >>, IEEE Transactions on Pattern Analysis and Machine Intelligence, vol. 28 No. 12, Dec. 2006, p. 470-481.

Viola, et al., "Robust Real-Time Face Detection", International Journal of Computer Vision, vol. 57 No. 2, May 2004, p. 137-154.

Viola, et al., "Rapid Object Detection Using a Booted Cascade with Simple Features", Accepted Conference on Computer Vision and Pattern Recognition, 2001, pp. 11.

* cited by examiner

REDUCING FALSE DETECTION RATE USING LOCAL PATTERN BASED POST-FILTER

BACKGROUND

Face detection is a computer technology that determines the locations and sizes of human faces in digital images.

The Viola-Jones face detection framework is the first face detection framework to provide competitive face detection rates in real time proposed in 2001 by Paul Viola and Michael Jones (Paul Viola and Michael J. Jones, Robust Real-Time Face Detection, 2001). In their paper Viola and Jones reported face detection proceeding at 15 frames per second on a conventional desktop of 2001. The Viola-Jones framework is considered to be state-of-the-art in face detection.

For the sake of performance, Viola and Jones based their framework on Haar features. A Haar feature is defined by 2, 3 or 4 adjacent regions of two types—so called "black" and "white" regions. The value of a Haar feature of a particular size at a particular location within an image is calculated by subtracting the sum of intensities of pixels belonging to black regions from the sum of intensities of pixels belonging to white regions. Viola and Jones suggested a data structure called "integral image" that makes it possible to calculate a Haar feature of any size in constant time. Because a Haar feature is a weak classifier, a large number of Haar features are needed to distinguish between faces and not-faces with accuracy. In the Viola-Jones face detection framework, classifiers are arranged in a cascade in which each successive classifier is trained only on samples that pass through the preceding classifiers. If a classifier rejects the sub-window under inspection, no further processing is performed and the next sub-window is searched.

The Viola-Jones face detection framework has a relatively high false detection rate. A false detection is a region that the face detector has determined contains a face but which actually does not contain a face.

A Local Binary Pattern (LBP) feature is a type of feature typically used for texture classification and facial recognition in computer vision. Local Binary Patterns were described for the first time by T. Ojala, M. Pietikainen, and D. Harwood in 1996 (T. Ojala, M. Pietikainen, and D. Harwood (1996), "A Comparative Study of Texture Measures with Classification Based on Feature Distributions", Pattern Recognition, vol. 29, pp. 51-59). The LBP feature vector can be created by dividing the examined window into cells. For each pixel in a cell, the pixel can be compared to each of its 8 neighbors (on its left-top, left-middle, left-bottom, right-top, etc.), following the pixels along a clockwise or counter-clockwise circle. If the center pixel's value is greater than the neighboring pixel's value, a value of 1 is assigned to that pixel. If the center pixel's value is not greater than the neighboring pixel's value, a value of 0 is assigned to that pixel, resulting in an 8-digit binary number. The histogram over the cell is computed of the frequency of each combination of which pixels are smaller and which are greater than the center pixel. The histogram can be normalized and normalized histograms of all the cells can be concatenated resulting in the feature vector for the window. The feature vector can be processed using the Support Vector Machine (SVM) or some other machine-learning algorithm, to produce a classifier.

The term SVM (Support Vector Machine) refers to a set of related learning methods that analyze data and recognize patterns. An SVM can be used for classification and regression analysis. The standard SVM is a non-probabilistic binary linear classifier. For each input it receives, the SVM can predict which of two possible classes the input is a member. An SVM training algorithm can receive a set of training examples, each member of the set marked as belonging to one of two categories. The SVM training algorithm can build a model that predicts into which category a new example input falls. An SVM model can represent members as points in space, mapped so that the examples of the separate categories are divided by a gap. The wider the gap the more reliable are the results of the categorization. When a new member is received, it can be mapped into the same space and predicted to belong to a category based on which side of the gap it falls on. An SVM can construct a hyperplane or set of hyperplanes in a high or infinite dimensional space, which can be used for classification, regression or other tasks. A good separation can be achieved by a hyperplane that has a larger distance to the nearest training data points of any class (called the functional margin). In general, the larger the margin, the lower the generalization error of the classifier.

SUMMARY

A post-filter classifier is added to a terminal end of a face detection pipeline. The post-filter classifier removes false positives in a face detection system. A false positive is a region that does not include a face but is mistakenly determined by a face detector as including a face. The post-filter classifier preserves most true positives. A true positive is a region determined by a face detector as including a face that indeed includes a face. The post-filter classifier can use LBP representation as features or can use any other features that are significantly different from Haar features (referred to herein as "not-Haar" features). The post-filter classifier can be based on a Support Vector Machine (SVM) that is trained using a labeled output of the face detector. Alternatively, any other machine learning method could be used to build the classifier.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Face detection systems are not perfect. Both false positives (images that do not include faces that are mistakenly classified by the face detector as including faces) and false negatives (images that do include faces that are mistakenly classified by the face detector as not including faces) are common. In many applications false positives are more problematic than false negatives. For example, missing some faces in a photo gallery software package is less objectionable than software that mistakenly displays stones and trees when asked to display faces. The number of false positives can usually be reduced by adjusting the threshold at the end of the classifier cascade of the face detector. For example, the Viola-Jones face detection framework returns a score representing the confidence level that the image returned includes a face. By increasing the score needed to classify an image as a face, the number of false positives can be reduced. However, increasing the threshold also increases the number of missed faces.

A face detector has to be fast because it has to inspect a large number of regions. Because a post-filter can inspect far fewer regions because only the regions classified as faces have to be inspected, more powerful, computationally expensive (e.g., slower) features and tools can be used. To maximize efficiency, features that are substantially different from the type of features used by the face detector can be used. One type of a feature that is very different from face detector features is the LBP feature.

In accordance with aspects of the subject matter disclosed herein a post-filter classifier is added at the end (terminating end) of a face detection pipeline. Because of its location at the end of the classifier cascade, such a post-filter classifier can take advantage of using more discriminative (and more computationally demanding) features, because it only has to inspect the regions that passed the face detection cascade. The post-filter classifier described herein can significantly reduce the false positive rate while maintaining an existing true positive rate substantially unchanged by using features such as but not limited to the Local Binary Patterns. Local Binary Patterns capture information that face detection classifiers do not use efficiently. The post-filter classifier described herein can be trained to distinguish between true positives and misdetections (false positives) in the output of face detection algorithms, a different and easier problem from distinguishing between images that include faces and those that do not.

After training a face detection system, the face detection system can be used to detect faces in images. The regions that the face detection system has determined include faces are collected and labeled manually by human inspection as positive or negative. The labeled set of regions can be a training set for a post-filter classifier that uses not-Haar features (such as but not limited to Local Binary Patterns) for face detection. The regions labeled positive are the true positives (do include faces) and the regions labeled negative are the false positives (the face detection system determined that the region included a face but it does not actually include a face). The positive and negative regions are used for training the post-filter classifier (such as but not limited to the Support Vector Machine) separating positive and negative dataset members.

Reducing False Detection Rate Using Local Pattern Based Post-Filter

Figure 1A:
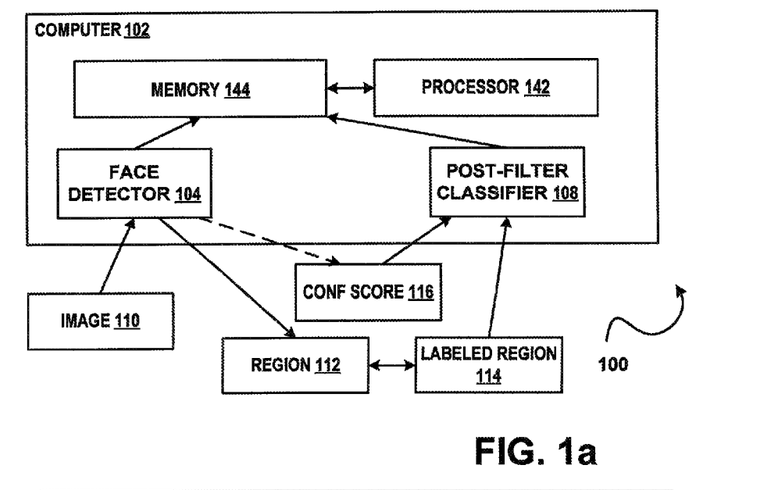
FIG. 1a illustrates an example of a system 100 for training a classifier in accordance with aspects of the subject matter disclosed herein.

FIG. 1a illustrates an example of a system 100 that trains a post-filter classifier of a face detection system in accordance with aspects of the subject matter disclosed herein. All or portions of system 100 can reside on one or more computers such as computer 102. A computer is described below with respect to FIG. 3. System 100 or portions thereof may be provided as a stand-alone system or as a plug-in or add-in.

System 100 may include one or more of: a computer 102 or computing device including a processor (such as processor 142) and a memory such as memory 144. System 100 may include one or more modules comprising one or more face detectors, represented in FIG. 1a by face detector 104. System 100 may include one or more modules comprising one or more face detection classifiers, represented in FIG. 1a by post-filter classifier 108. Other components well known in the arts may also be included but are not here shown. It will be appreciated that the above described modules can be loaded into memory 144 to cause one or more processors such as processor 142 to perform the actions attributed to the module(s).

In accordance with aspects of the subject matter disclosed herein, one or more face detectors such as face detector 104 can receive an image such as image 110. Image 110 can be any grayscale digital image such as a photograph, video frame or other two-dimensional depiction. Image 110 can be any color digital image such as a photograph, video frame or other two-dimensional depiction. Face detector 104 or another component may convert the color digital image into a grayscale image using any conversion technique. Face detector 104 can be trained using any machine learning techniques. After training a face detection system, the face detection system can be used to detect human faces in images. The face detector 104 can be a Viola-Jones type face detector or any type of face detector that produces regions such as region 112 in which the face detector has detected a face.

The set of regions produced by the face detector can be used as a training set of regions for a post-filter classifier described more fully below. The set of regions produced by the face detector can include true positives and false positives. True positives are regions that the face detector has determined include faces and the regions actually do include faces. False positives are regions that the face detector has determined include faces and the regions actually do not include faces. The regions which the face detector 104 has determined to include faces can be provided to a human for manual labeling as positive (includes a face) or negative (does not include a face) to create a set of labeled regions 114 used for training a face detection classifier such as post-filter classifier 108. That is, regions labeled positives are true positives and regions labeled negative are false positives.

Figure 1B:
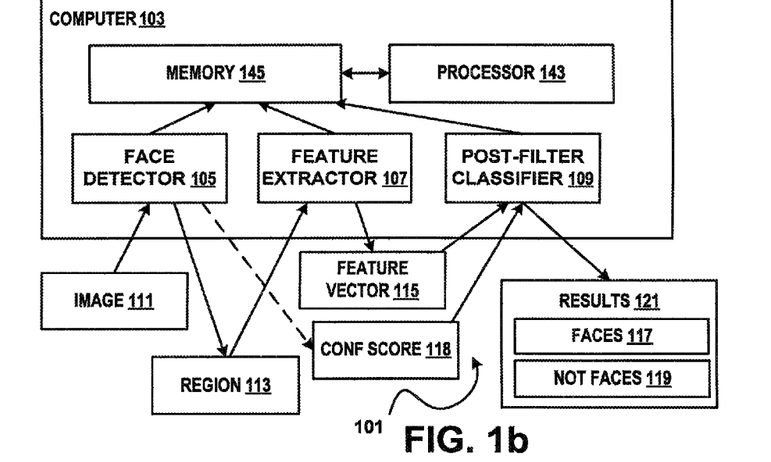
FIG. 1b illustrates an example of a system 101 for reducing false detection rate using a post-filter classifier in accordance with aspects of the subject matter disclosed herein.

The positive-labeled regions and the negative-labeled regions can be provided to a post-filter classifier 108 to train the face detection classifier using machine learning techniques. The classifier that is trained may also receive a confidence score such as confidence score 116. A confidence score is associated with each positive or negative labeled region and indicates a degree of certainty or a degree of lack of certainty that the region includes a face. The confidence score can be generated by the face detector 104. After the post-filter classifier has been trained, a system that has lower false detection rate than the original face detector can be built. One example of such a system is represented in FIG. 1b. The components that FIGS. 1a and 1b both include can be the same or different components or can be any combination thereof, however, it will be appreciated by those of skill in that art that in accordance with aspects of the subject matter disclosed herein, more predictable results can be expected if the post-filter classifier is tightly coupled to the detector whose output was used for its training.

FIG. 1b illustrates an example of a system 101 that may reduce false detection rate using a post-filter classifier in accordance with aspects of the subject matter disclosed herein. System 101 can detect a face in an image using an extracted feature. All or portions of system 101 can reside on one or more computers such as computer 103. A computer is described below with respect to FIG. 3. System 101 or portions thereof may be provided as a stand-alone system or as a plug-in or add-in.

System 101 may include one or more of: a computer or computing device 103 including a processor (such as processor 143), and a memory such as memory 145. System 101 may include one or more modules comprising one or more face detectors, represented in FIG. 1a by face detector 105. Computer 102 may be the same or the same as computer 103 or can be a different computer or computing device. System 101 may include one or more modules comprising one or more feature extractors such as feature extractor 107. System 101 may include one or more modules comprising one or more trained face detection classifiers, represented in FIG. 1a by post-filter classifier 109. Other components well known in the arts may also be included but are not here shown. It will be appreciated that the above described modules can be loaded into memory 145 to cause one or more processors such as processor 143 to perform the actions attributed to the module(s).

In accordance with aspects of the subject matter disclosed herein, one or more face detectors such as face detector 105 can receive an image such as image 111. Image 111 can be any grayscale digital image such as a photograph, video frame or other two-dimensional depiction. Image 111 can be any color digital image such as a photograph, video frame or other two-dimensional depiction. Face detector 105 or another component or module (not shown) may convert the color digital image into a grayscale image using any conversion technique. Face detector 105 can be trained using known training techniques. After training a face detection system, the face detection system can be used to detect faces in images. The face detector 105 can be a Viola-Jones type face detector or any type of face detector that produces regions 113 in which the face detector has detected a face. The regions which the face detector 105 has determined to include faces can be provided to one or more feature extractors such as feature extractor 107.

The feature extractor 107 may extract a feature that is substantially unlike the features used by the face detector 105. For example, if the face detector is based on Haar features, the feature extractor 107 may extract descriptors of not-Haar features. Another type of feature that is very different from face detector features is the LBP feature.

The feature extractor may produce one or more feature vectors such as vector 115. The feature extractor can provide a descriptor of a feature different from the features used by face detector 105 such as but not limited to an LBP feature. The extracted feature can be substantially different than a facial detection feature. The extracted feature can be a facial recognition feature. The one or more vectors or descriptors can be provided to a classifier such as post-filter classifier 109. Post-filter classier may be but is not limited to being an SVM classifier.

The classifier may also receive a confidence score such as confidence score 118. A confidence score can be an indication associated with each region and can indicate a degree of certainty or a degree of lack of certainty that the region includes a face. The confidence score can be generated by the face detector 105. The post-filter classifier can produce results 121 comprising a result or indication that indicates that the image 111 includes a face (represented in FIG. 1b by faces 117) and/or comprising a result that indicates that the image 111 does not include a face (represented in FIG. 1b by not faces 119). The classifier can be a post-filter classifier that receives a descriptor of a feature (or several features) and the confidence score (optionally) for a region detected by face detector as including a face and classifies this region as including a face or not including a face. System 101 can produce fewer false positives than analogous system without a post-filter classifier while keeping nearly the same number of true detections.

Figure 2A:
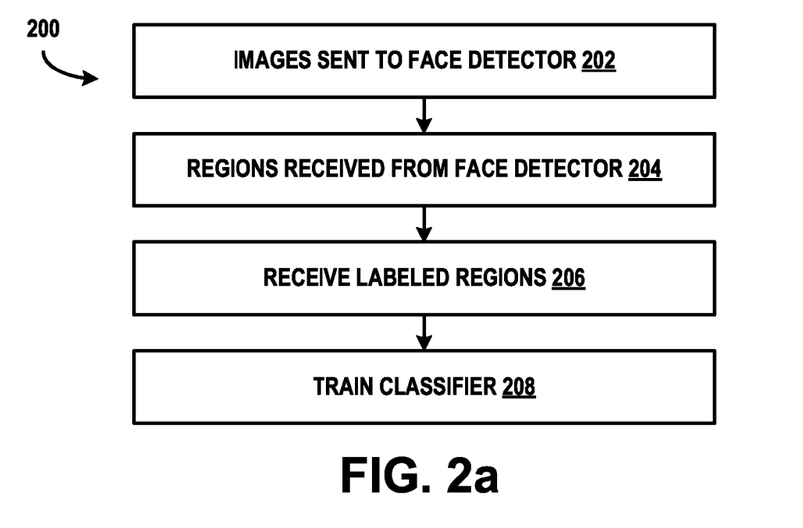
FIG. 2a is a flow diagram of an example of a method 200 for training a classifier in accordance with aspects of the subject matter disclosed herein.

FIG. 2a is an example of a method 200 for training a post-filter face detection classifier including but not limited to an SVM machine in accordance with aspects of the subject matter disclosed herein. Method 200 can be implemented on a system such as but not limited to the one described with respect to FIG. 1a. Some of the actions described below can be optional. Some of the actions described below can be executed in a sequence that differs from that described below.

At 202 a set of images can be sent to a face detector as described above. In accordance with some aspects of the subject matter described herein, the face detector may be a Viola-Jones face detector. At 204 the output of the face detector can be received. The output of the face detector can be a set of regions. Each region in the set of regions can be associated with a score that represents a degree of certainty that the region includes a face. At 206, the set of regions can be labeled as positive (the region includes a face) or negative, (the region does not include a face). The set of labeled regions and their associated confidence scores can be used to train a post-filter classifier at 208. In accordance with some aspects of the subject matter disclosed herein the classifier may be an SVM. The trained classifier can be placed at the end of a face detection pipeline comprising a face detector, one or several feature extractors and the trained post-filter classifier.

Figure 2B:
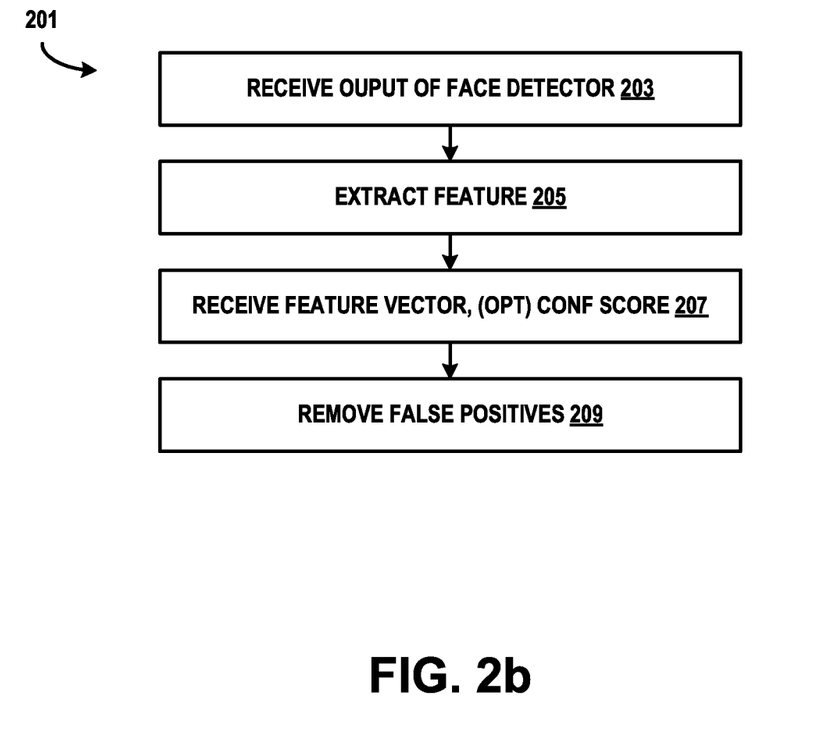
FIG. 2b is a flow diagram of an example of a method 201 for reducing false detection rate using a post-filter classifier in accordance with aspects of the subject matter disclosed herein.

FIG. 2b is an example of a method 201 that may reduce false detection rate using a post-filter classifier in accordance with aspects of the subject matter disclosed herein. Method 201 can be implemented on a system such as but not limited to the one described with respect to FIG. 1b. Some of the actions described below can be optional. Some of the actions described below can be executed in a sequence that differs from that described below.

A trained classifier can be placed at the end of a face detection pipeline. At 203 the output of a face detector can be received. The face detector in accordance with some aspects of the subject matter disclosed herein can be a Viola Jones face detector as described above. The output of the face detector can be a set of regions. Each region optionally can be associated with a score that represents a degree of certainty that the region includes a face. At 205, the region can be received by one or more feature extractors. In accordance with some aspects of the subject matter disclosed herein the feature extractor can be an LBP feature extractor. The feature extractor may extract features that are significantly different than the features used by the face detector. For example, if the face detector is based on Haar features, the feature extractor can be based on not-Haar features. At 207 the result of the feature extractor (e.g., an LBP vector) and the confidence score of the face detector can be sent to a classifier for categorization (e.g., as including a face or not including a face). In accordance with some aspects of the subject matter disclosed herein the classifier may be an SVM trained as described with respect to FIG. 2a.

The method described can reduce false detection rate of the face detector by using feature different from Haar features such as an LBP feature, and placing a classifier trained as described with respect to FIG. 2a at the end of the face detection pipeline. The classifier is called a post-filter because it is placed at the end of the face detection pipeline and can use the output of a face detector classifier cascade. Method 201 removes false positives 209 from the set of regions produced by the face detector by training a classifier to distinguish between false positives and true positives in the output of the face detector based on features different from Haar features used by face detector.

Example of a Suitable Computing Environment

Figure 3:
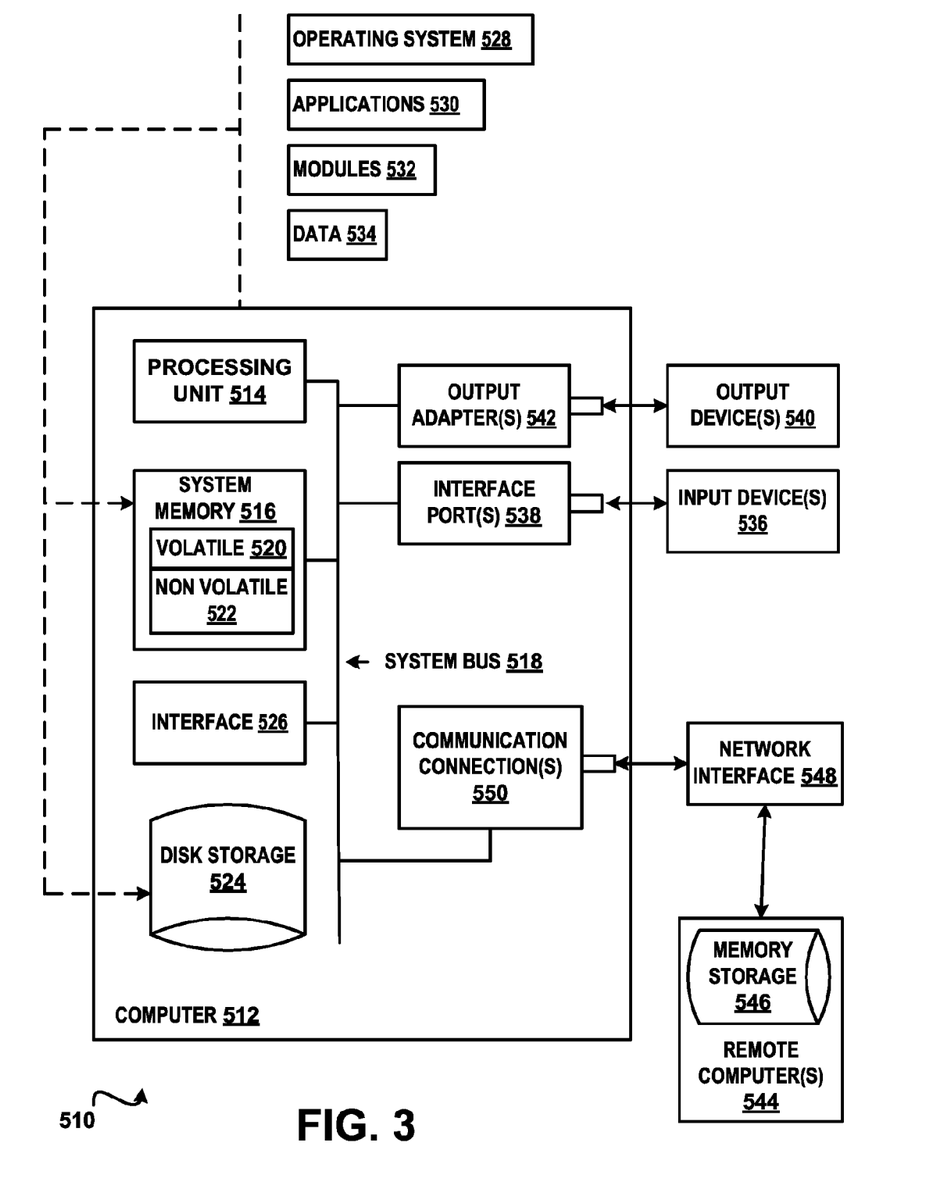
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include a processing unit 514, a system memory 516, and a system bus 518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other transitory or non-transitory medium which can be used to store the desired information and which can be accessed by computer 512.

It will be appreciated that FIG. 3 describes software that can act as an intermediary between users and computer resources. This software may include an operating system 528 which can be stored on disk storage 524, and which can control and allocate resources of the computer system 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection 550. Network interface 548 encompasses communication networks such as local area networks (LANs) and wide area networks (WANs) but may also include other networks. Communication connection(s) 550 refers to the hardware/software employed to connect the network interface 548 to the bus 518. Connection 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-particular programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

While the subject matter disclosed herein has been described in connection with the figures, it is to be understood that modifications may be made to perform the same functions in different ways.

What is claimed:

1. A system comprising:
   a processor and a memory of a computing device; and
   at least one module on the computing device configured to cause the processor to:
   receive an output of a face detector, the face detector detecting faces using Haar features, the output comprising a set of regions that the face detector has determined include faces;
   extract from each region of the set of regions, at least one descriptor of a not-Haar feature; and
   send the at least one descriptor of the not-Haar feature to a post-filter classifier placed at a terminating end of a face detection pipeline to categorize the output as a face or false positive,
   wherein the post-filter classifier is a trained support vector machine,
   wherein the post-filter classifier is trained using a set of training regions output from the face detector, the set of training regions including regions that do include a face and regions that are mistakenly classified by the face detector as including faces.

2. The system of claim 1, wherein the face detector is a Viola Jones face detector.

3. The system of claim 1, wherein the not-Haar feature is a Local Binary Pattern feature.

4. The system of claim 1, where the not-Haar feature is a facial recognition feature.

5. The system of claim 1, wherein each region of the set of regions has an associated score wherein the associated score comprises an indication of a degree of confidence that a region associated with the score comprises a face.

6. A method comprising:
   receiving a region by a processor of a computing device, the region comprising an output of a face detector, the face detector detecting faces using Haar features;
   extracting a descriptor of a not-Haar feature from the received region;
   receiving the extracted descriptor; and
   determining results comprising a result indicating that the received region comprises a face or a result indicating that the received region does not comprise a face by sending the descriptor of the not-Haar feature to a post-filter classifier placed at a terminating end of a face detection pipeline, wherein the post-filter classifier is a trained support vector machine,
   wherein the post-filter classifier is trained using a training set of regions output from the face detector, the training set of regions including regions that do include a face and regions that are mistakenly classified by the face detector as including faces.

7. The method of claim 6, wherein the not-Haar feature is a facial recognition feature.

8. The method of claim 6, further comprising:
   extracting the descriptor of the face detection feature using a Local Binary Pattern feature extractor.

9. The method of claim 6, wherein the region has an associated score wherein the associated score comprises an indication of a degree of confidence that the region comprises a face.

10. The method of claim 6, further comprising:
    reducing a set of regions input to the post-filter classifier by a number of regions that the face detector has determined include faces.

11. The method of claim 6, wherein the face detector is a Viola-Jones face detector.

12. A computer-readable storage device comprising computer-executable instructions which when executed cause at least one processor to:
    use a not-Haar feature to detect a face in an image by:
    receiving the output of a face detector, the face detector detecting faces using Haar features, the output comprising a region;
    extracting from the region, a descriptor of a not-Haar feature; and
    sending the descriptor to a trained face detection post-filter classifier, wherein the trained face detection classifier provides a result indicating that the region includes a face or provides a result indicating that the region does not include a face,
    wherein the trained face detection post-filter classifier is a trained support vector machine,
    wherein the trained face detection post-filter classifier is trained using a set of training regions output from the face detector, the set of training regions including regions that do include a face and regions that are mistakenly classified by the face detector as including faces.

13. The computer-readable storage device of claim 12, comprising further computer-executable instructions, which when executed cause the at least one processor to:
    receive the output of a Viola Jones face detector, the output comprising a region that the Viola Jones face detector determined includes a face.

14. The computer-readable storage device of claim 12, comprising further computer-executable instructions, which when executed cause the at least one processor to:
    extract from the region, a descriptor of a not-Haar feature comprising a facial recognition feature.

15. The computer-readable storage device of claim 12, comprising further computer-executable instructions, which when executed cause the at least one processor to:
    train the trained face detection post-filter classifier using Support Vector Machine training techniques.

16. The computer-readable storage device of claim 12, comprising further computer-executable instructions, which when executed cause the at least one processor to:
    execute the trained face detection post-filter classifier at a terminal end of a face detection pipeline.

17. The computer-readable storage device of claim 12, comprising further computer-executable instructions, which when executed cause the at least one processor to:
    receive the output of a Viola Jones face detector.

18. The system of claim 1, wherein each region is labeled one of positive or negative, wherein a region labeled positive is a true positive, and wherein a region labeled negative is a false positive.

19. The method of claim 6, wherein each region is labeled one of positive or negative, wherein a region labeled positive is a true positive and wherein a region labeled negative is a false positive.

20. The computer-readable storage device of claim 12, wherein each region is labeled either positive or negative, wherein a region is labeled positive is a true positive, and wherein a region labeled negative is a false positive.

* * * * *